No. 831,928. PATENTED SEPT. 25, 1906.
J. J. CHAPMAN.
NUT LOCK.
APPLICATION FILED APR. 23, 1906.
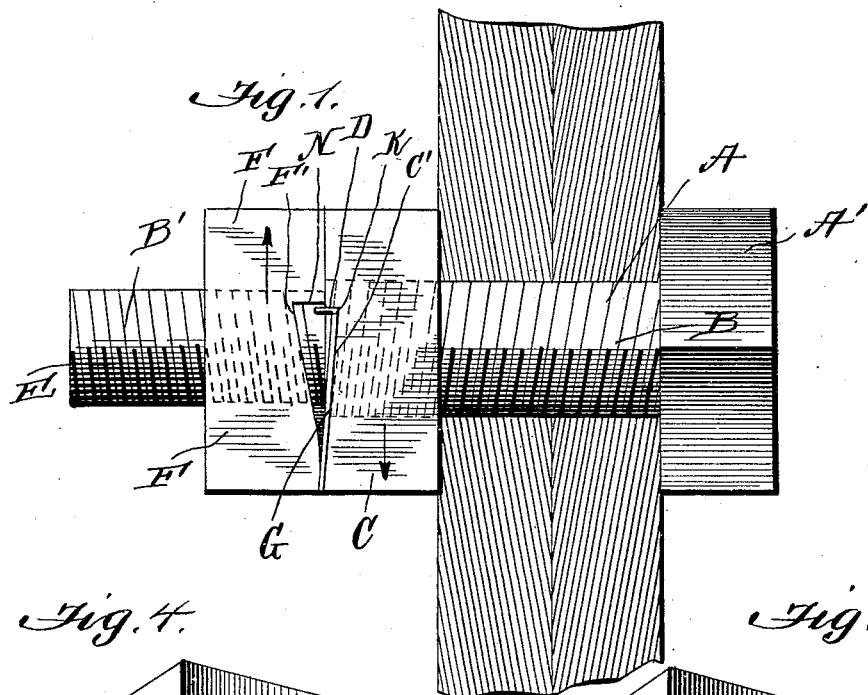
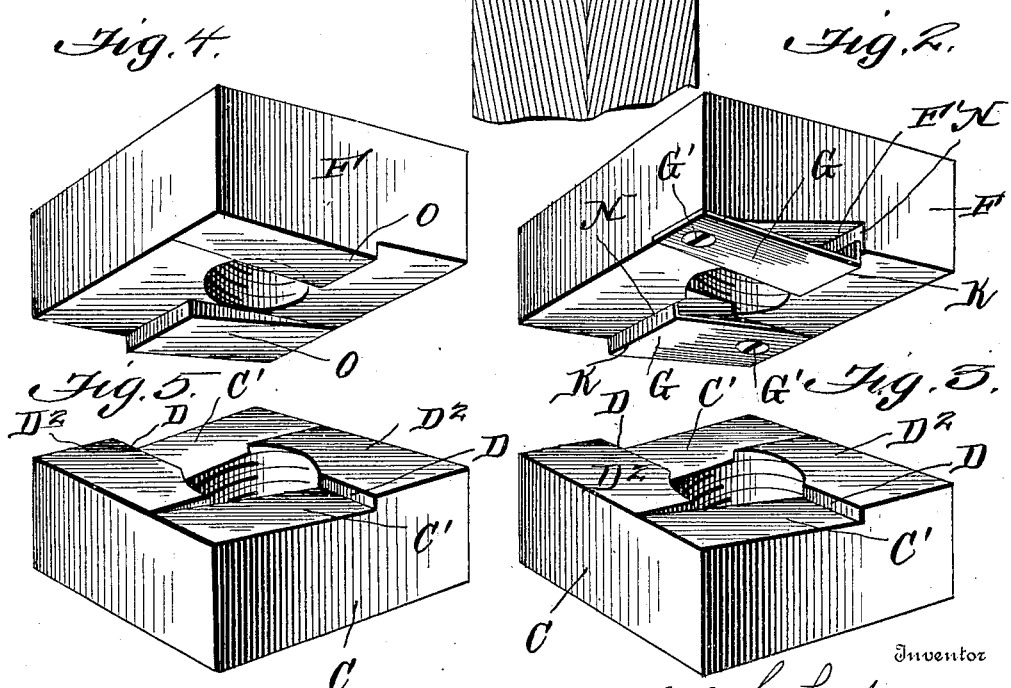

UNITED STATES PATENT OFFICE.

JOHN JAMES CHAPMAN, OF OGBURN, VIRGINIA, ASSIGNOR OF ONE-HALF TO N. C. CRAFTON, OF KINDERWOOD, VIRGINIA.

NUT-LOCK.

No. 831,928.     Specification of Letters Patent.     Patented Sept. 25, 1906.

Application filed April 23, 1906. Serial No. 313,252.

*To all whom it may concern:*

Be it known that I, JOHN JAMES CHAPMAN, a citizen of the United States, residing at Ogburn, in the county of Mecklenburg and State of Virginia, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut-locks; and the object of the invention is to produce a device of this character in which a bolt is provided with right and left threads, each threaded portion having a distinct diameter, the adjacent faces of the nuts being provided with raised portions, one of which nuts is provided with a shouldered portion adapted to engage the shoulder upon the adjacent nut for preventing the nut from turning in one direction.

The invention consists, further, in various details of construction and in combinations and arrangements of parts, which will be hereinafter fully described and then specifically defined in the appended claim.

My invention is illustrated in the accompanying drawings, in which—

Figure 1 is a side elevation of my improved nut-lock, showing the nuts held in locked positions. Fig. 2 is a perspective view of one of the nuts, showing the yielding spring with an angled portion adapted to abut against a portion of the adjacent nut. Fig. 3 is a detail view of one of the nuts, showing the manner of recessing the end thereof. Fig. 4 is a detail perspective of a slight modification, and Fig. 5 is a view showing the nut as adapted to be engaged by the modified form illustrated in Fig. 4.

Reference now being had to the details of the drawings by letter, A designates a bolt having a head A', and the shank B of said bolt is provided with left threads, and C designates a nut with left threads adapted for engagement with the threads upon the shank portion B. The outer face of the nut C has two cut-away or recessed portions C', forming two shoulders D, and the bottom of each recessed portion is inclined, as shown, while portions $D^2$ of the recessed face are preferably in the same plane and parallel with the opposite face of the nut. The contracted portion B' of said bolt is provided with right threads E, and said contracted portion is adapted to receive the nut F, which has a bore provided with right threads. The inner face of the nut F has two recessed portions F', corresponding to the inclined recessed portions C' in the nut C, and G designates springs fastened at G' to the inner face of the nut, and the free ends of said springs are bent at an angle, as at K, and are positioned adjacent to the shouldered portions N, formed in the face of the nut. The normal positions of said springs are as shown in Figs. 1 and 2 of the drawings, in which the angled portions thereof project beyond the outer face of the nut and are adapted to abut against the shoulders D on the inner nut C, as shown in Fig. 1 of the drawings, thereby providing means whereby the outer nut will be prevented from loosening, while the inner nut will be held in place by the outer nut should there be any tendency to said inner nut working loose.

In Fig. 4 of the drawings I have shown a slight modification of the outer nut in which instead of the springs shown I have illustrated raised portions O, corresponding to the recessed or depressed portions C', which they are adapted to engage when the two nuts are screwed together, the one being screwed upon the left threads and the other upon the right threads in the manner disclosed. As the nut F is screwed down against the nut C and when the springs are not utilized for holding the nuts from rotary movement and it is desired to have the rigid shoulders O interlock in the recesses C', the bolt A' may be turned slightly, and as the contracted threaded end of said bolt has threads reversely arranged to those shown upon the part engaged by the nut C it will be noted that the nut F may be drawn toward the nut C when the shoulders O are turned so as to engage the recesses provided therefor.

Having thus fully described my invention, what I claim as new, and desire to secure by Letters Patent, is—

A nut-lock comprising a bolt having a shank portion with right and left threads, nuts with right and left threads fitted to said bolts, the adjacent faces of said nuts having recesses, the bottoms of which are inclined and terminating in shoulders which are parallel to each other, said recesses inclining in opposite directions, a spring fastened to the outer inclined end of each recess in one of said nuts and having its free angled end extending beyond the shoulder of the nut to which the spring is secured and adapted to yield in said recess, each spring adapted to abut against a shoulder upon the adjacent faces of the other nut, as shown and described.

In testimony whereof I hereunto affix my signature in presence of two witnesses.

JOHN JAMES CHAPMAN.

Witnesses:
   D. B. BELL,
   H. C. SMITH.